United States Patent [19]

Yokoyama et al.

[11] Patent Number: 5,378,274
[45] Date of Patent: Jan. 3, 1995

[54] COLOR FILTER, METHOD FOR MANUFACTURE THEREOF AND LIQUID CRYSTAL PROJECTOR USING SAID COLOR FILTER

[75] Inventors: Seiichiro Yokoyama; Motoharu Ishikawa; Yoshio Hiroi; Nobuaki Watanabe, all of Sodegaura, Japan

[73] Assignee: Idemitsu Kosan Co., Ltd., Tokyo, Japan

[21] Appl. No.: 133,114

[22] PCT Filed: Feb. 18, 1993

[86] PCT No.: PCT/JP93/00196
   § 371 Date: Oct. 19, 1993
   § 102(e) Date: Oct. 19, 1993

[87] PCT Pub. No.: WO93/17357
   PCT Pub. Date: Sep. 2, 1993

[30] Foreign Application Priority Data

Feb. 19, 1992 [JP] Japan ............................ 4-031905

[51] Int. Cl.$^6$ ............................................. C09B 67/50
[52] U.S. Cl. ......................................... 106/410; 106/411; 106/493; 106/494; 106/495; 106/497; 106/498; 252/582; 252/584; 252/585; 252/586; 359/885; 428/410
[58] Field of Search ............... 359/885; 252/582, 584, 252/585, 586; 106/410, 411, 493, 494, 495, 497, 498; 428/410

[56] References Cited

U.S. PATENT DOCUMENTS

| | | | |
|---|---|---|---|
| 2,728,814 | 12/1955 | Berger | 359/885 |
| 3,104,176 | 9/1963 | Hovey | 359/885 |
| 4,786,148 | 11/1988 | Sekimura et al. | 359/885 |
| 4,934,791 | 6/1990 | Shimizu et al. | 252/582 |
| 5,185,074 | 2/1993 | Yokoyama et al. | 359/885 |

FOREIGN PATENT DOCUMENTS

| | | |
|---|---|---|
| 0355585 | 2/1990 | European Pat. Off. |
| 60-41086 | 3/1985 | Japan |
| 60-129707 | 7/1985 | Japan |
| 60-208704 | 10/1985 | Japan |
| 62-89906 | 4/1987 | Japan |
| 2-24603 | 1/1990 | Japan |

Primary Examiner—Karl Group
Assistant Examiner—Scott L. Hertzog
Attorney, Agent, or Firm—Oblon, Spivak, McClelland, Maier, & Neustadt

[57] ABSTRACT

Disclosed herein are a color filter wherein an organic pigment is comprised of primary particles having an average particle size of 20 to 200 nm and a particle size distribution within ±35 nm and said organic pigment has a color difference of 5 or less when it is subjected to exposure at an illuminance of 100,000 lux or more for 100 hours or more under the condition of a surface temperature at 50° C.; a color filter wherein the film of coloring matter in green has a ratio ($T_{485}/T_{610}$) of the transmittance of 485 nm ($T_{485}$) to that of 610 nm ($T_{610}$) of 3.5 or less, the maximum transmittance of the film of coloring matter in green is 60% or more and said maximum transmittance is assigned a wavelength of 540 to 550 nm; and a color filter using a specific organic pigment as each of red, green and blue pigments.

5 Claims, 5 Drawing Sheets

COLOR FILTER, METHOD FOR MANUFACTURE THEREOF AND LIQUID CRYSTAL PROJECTOR USING SAID COLOR FILTER

TECHNICAL FIELD

The present invention relates to a novel color filter, a method for manufacture of said color filter and a liquid crystal projector using said color filter. More particularly, it relates to a color filter having a film of coloring matter in the three primary colors of red (R), green (G) and blue (B), excellent light resistance and heat resistance and capable of withstanding the use of highly bright light sources, a method for efficiently manufacturing said color filter according to the micellar disruption method and a liquid crystal projector using said color filter which has a long life and is economically advantageous.

BACKGROUND ART

In recent years, color displays of image in liquid crystal television sets, personal computers of lap top type and so on have been advanced by the development of multicolor display devices comprising a linear electrode-simple matrix, time-sharing drive or an active matrix drive wherein every picture element is incorporated with a thin film transistor (TFT).

Some of these developments have already been merchandised as a small size color liquid crystal television set.

These multicolor display devices use color filters having films of coloring matter in the three primary colors of RGB. Conventionally, the color filters have been manufactured according to various methods. For example, the dyeing method (Japanese Patent Application Laid-Open No. 55301/1985), the printing method (Japanese Patent Application Laid-Open No. 46325/1983 and Japanese Patent Application Laid-Open No. 29225/1984), the pigment dispersion method (Japanese Patent Application Laid-Open No. 237403/1985), the electrodeposition method (Japanese Patent Application Laid-Open No. 270730/1986), the vapor deposition method (Japanese Patent Application Laid-Open No. 166607/1980), the micellar disruption method (Japanese Patent Application Laid-Open No. 243298/1988 and Japanese Patent Application Laid-Open No. 50538/1988 through PCT) and so on have been known. The color filters thus manufactured have widely been used as the liquid crystal display material in liquid crystal television sets (Japanese Patent Application Laid-Open No. 7886/1986), personal computers of lap top type (Japanese Patent Application Laid-Open No. 105613/1985) and so on.

Meanwhile, liquid crystal projectors such as liquid crystal television projector, overhead projector and video projector have attracted attention as a large size display apparatus to replace color CRTs, and their development has been sped up in recent years. There have been known two types of liquid crystal projector. One of them is a projector of single plate type (Japanese Patent Application Laid-Open No. 41086/1985) and another a projector of three plate type (Japanese Patent Application Laid-Open No. 306792/1988 ). However, the devices of single plate type have a short life because of conventional color filters all of which are poor in light resistance and it is necessary that these devices be improved so as to prolong the service life. On the other hand, the liquid crystal projectors of three plate type have the drawbacks that their manufacturing cost is at a high side because they have to have an equivalent to 3 sets each of optical system and dichroic mirror and that the optical system is a complicated one.

Thus, it is necessary that a color filter excellent in light resistance be developed. Liquid crystal projectors of single plate type capable of using strong light sources will be made available by the use of color filters having excellent light resistance if such color filters come true. In addition, liquid crystal panels for overhead projector and for car will be permitted to use strong backlighting with the improved color filters, to have elevated reliability and a significantly longer life.

In color filters, the light is shielded respectively in part of the wavelengths ascribed to every color to generate the heat. Accordingly, highly bright light sources applied to color filters gives rise to the elevation of temperatures on the surface of the color filters. If still brighter light sources are used to obtain clearer pictures, the temperatures on the surface of the color filters are brought up even higher, and thus light resistance under further elevated temperature conditions is required.

Conventionally, it has been known that mixed systems of pigments denoted by the following Color Index Pigment Number (C.I.P.) are used as the organic pigment of color filters having high light resistance as disclosed in Japanese Patent Application Laid-Open No. 89906/1987:

:9, 97, 122, 123, 149, 168, 177, 180, 192, 215 216, 217, 220, 223, 224, 226, 227, 228, 240

Yellow (Y) :20, 24, 86, 93, 109, 110, 117, 125, 137, 138, 147, 148, 153, 154, 166, 168

Green (G) :7, 36

Blue (B) : 15, 15:6, 22, 60, 64

Violet (V) : 19, 23, 30, 37, 40, 50

However, liquid crystal projectors developed recently have a 3~5 inch panel to be magnified to the size of 40~200 inches, and it is necessary to project on the panels by the use of very strong light sources. It is known that projections are converged with microlenses attached to picture element. In these liquid crystal projectors, the projections are converged in this way, requiring the passage of the light of 100,000 lux or more through color filters, and it is impossible that all of above-mentioned organic pigments can withstand the use of light sources as strong as above. Thus, a color filter resistant to light sources of 100,000 lux or more, preferably 500,000 lux or more and more preferably 1,000,000 or more is desired. The necessity is particularly urgent in the red and green colors which are susceptible to the quick deterioration.

DISCLOSURE OF THE INVENTION

Under these circumstance, the present inventors have made intensive studies with a view to developing a color filter excellent in light resistance and capable of withstanding the use of said highly bright light sources which are preferably used in liquid crystal projectors, large size internal liquid crystal panels for car and so on, a method for efficiently manufacturing said color filter and a liquid crystal projector using said color filter to have a long life. As the result, they have had the following findings:

At first, pigments were chosen on the basis of light resistance against the use of said highly bright light sources. Specifically, it was found that there is sufficient light resistance in C.I. Pigment Rod 168 (anthanthrone-based pigment), C.I. Pigment Red 177 (dianthraquinine-based pigment), C.I. Pigment Yellow 110 (isoindolinone-based pigment), C.I. Pigment Green 7 (chlorocopperphthalocyanine-based pigment), C.I. Pigment Green 36 (chlorobromocopperphthalocyanine-based pigment), C.I. Pigment Blue 15:3, 15:4 (monochlorocopperphthalocyanine-based pigment), C.I. Pigment Blue 15:6 (monochlorocopperphthalocyanine-based pigment) and C.I. Pigment Violet 23 (dioxane-based pigment). Furthermore, the red and green were found to be susceptible to the quicker deterioration than the blue by far. The cause for the deterioration was investigated to determine that the yellow pigments used to adjust the color tone of the red or green are liable to deteriorate significantly. Thus, it was found that color filters can be made light resistant as a whole by using as the red (R) a single C.I. Pigment Red 168 or a single C.I. Pigment Red 177 or a mixed system pigment combining C.I. Pigment Red 168 with C.I. Pigment Yellow 110 or a mixed system pigment combining C.I. Pigment Red 177 with C.I. Pigment Yellow 1 1 0; as the green (G) a mixed system pigment combining C.I. Pigment Green 7 or C.I. Pigment Green 36 with C.I. Pigment Yellow 110; and as the blue (B) a mixed system pigment combining C.I. Pigment Blue 15:3, 15:4 or 15:6 with C.I. Pigment Violet 23.

For conventional color filters, their pigments were chosen giving priority to spectral properties. These color filters were poorly resistant to the light when they were subjected to exposure by the use of intensely bright light sources. Furthermore, even some of the light resistant pigments including those disclosed in Japanese Patent Application Laid-Open No. 89906/1987 were found not to have sufficient spectral properties when they were used along with the intensely bright light sources as set forth above. As evident from these findings, it is essential that the pigments chosen as above be used as a light resistant pigment when intensely bright light sources are participated.

On the other hand, an attempt was made to obtain improved light resistance from a measure of light resistance inherent in certain pigments. In the pigments comprised of primary particles having a wide particle size distribution from coarse to fine, the light helped particles grow fast, and when the light was irradiated to these particles, their colors were liable to change significantly. It was found on the basis of this knowledge that where there is high transparency of pigments whose primary particles have an average size in a range of $20 \sim 200$ nm, preferably $20 \sim 150$ nm and more preferably $20 \sim 100$ nm, the said pigments can obtain markedly improved light resistance by controlling the particle size distribution to be within $\pm 35$ nm to obtain the uniform particles and thus preventing the growth of particles due to the light.

Furthermore, the films of coloring matter in the green are different from those of the red or blue in that light shielding is not sufficient if merely the light having a wavelength longer or shorter than a certain wavelength is restrained from the transmission. For the green color films, well-balanced light shielding should be achieved by blocking both the wavelengths ascribed to the red and the wavelengths ascribed to the blue simultaneously. Accordingly, it is necessary to prevent the lights having a wavelength of 485 nm or shorter and a wavelength of 610 nm or longer from transmission and therefore to shield the transmitted light at 485 nm or shorter by the yellow and that at 610 nm or longer by the green. More specifically, a ratio ($T_{485}/T_{610}$) of the transmittance at 485 nm ($T_{485}$) to that at 610 nm ($T_{610}$) need to be 3.5 or less, preferably 3.0 or less and more preferably $0.5 \sim 3.0$.

Furthermore, the lights having wavelengths ascribed to RGB at the light source should be used effectively to the full extent to bring the characteristics of the color filters to work satisfactorily. For this, it is necessary to maximize the integrated quantity of transmitted light at the wavelength ascribed to each color of RGB. More specifically, each color film should have the maximum transmittance of 60% or more, preferably 65% or more and more preferably 70% or more. Particularly, in order to maximize the integrated quantity of transmitted light in green, the maximum transmittance of the green is assigned the wavelengths in a range of $540 \sim 550$ nm.

Briefly, the films of coloring matter in green having very good spectral properties can be obtained by choosing the appropriate pigments, adjusting their mixing ratio and classifying their particles. The green color films thus produced have a ratio ($T_{485}/T_{610}$) of the transmittance at 485 nm ($T_{485}$) to that at 610 nm ($T_{610}$) of 3.5 or less, preferably 3.0 or less and more preferably $0.5 \sim 3.0$, while the maximum transmittance of the film of coloring matter in green is 60% or more, preferably 65% or more and more preferably 70% or more and said maximum transmittance is assigned the wavelengths in a range of 540 to 550 nm.

Of the yellow organic pigments as defined above, the C.I. Pigment Yellow 110 (isoindolinone-based pigment) was found to be preferably used as the yellow pigment to adjust the color tone of either or both of the red and green. It was also found that above-mentioned spectral properties can be obtained by using a mixture of C.I. Pigment Green 36 (chlorobromophthalocyanine-based pigment) and C.I. Pigment Yellow 110 (isoindolinone-based pigment) as the green.

Meanwhile, the micellar disruption method is free of binder resins, helpful to obtain excellent heat resistance and light resistance and improves depolarizing properties which are an important problem to compounds of the pigment series. Therefore, the micellar disruption method is particularly preferred in the manufacture of color filters, although any one of the pigment dispersion method, the printing method and the micellar disruption method is suitable.

However, it should be pointed out that the conventionally known method for the preparation of organic pigment dispersions as disclosed in Japanese Patent Application Laid-Open No. 243298/1988 and Japanese Patent Application Laid-Open No. 30794/1990 is not good enough to manufacture the color filters excellent in light resistance from organic pigments according to the micellar disruption method. To provide organic pigments comprising primary particles having an average particle size of 200 nm or smaller, a surfactant comprising a ferrocene derivative, an organic pigment and a supporting salt are mixed in an aqueous medium; the resultant mixture is dispersed for 0.5 hour or more per liter, preferably $0.5 \sim 2$ hours per liter in the presence of ultrasonic waves by the use of a ultrasonic dispersing device of 50 W or more, preferably 300 W or more and more preferably 600 W or more; and the dispersion formed as above is centrifuged with a centrifugal force of $4000 \times g$ (g denotes the acceleration of gravity) or more, to be followed by filtration if necessary. In this way, the dispersion is made to contain the pigments whose primary particles are classified to have the average particle size in the range of 20~200 nm and a particle size distribution within ±35 nm. The color filters having excellent light resistance can be obtained only when their films are formed of this dispersion of organic pigment according to the micellar disruption method.

The present invention has been completed on the basis of such findings. Accordingly, the present invention provides (1) a color filter having a film of coloring matter in the three primary colors of red, green and blue, wherein the organic pigments forming the film of coloring matter in each of red, green and blue are comprised of primary particles having an average particle size of 20~200 nm and a particle size distribution within ±35 nm and furthermore said organic pigments have a color difference of 5 or less after said pigments as contained in color filters are subject to exposure for 100 hours or more at an illuminance of 100,000 lux or more by the use of a highly bright light source for projection under the condition of a surface temperature at 50° C. or higher, (2) a color filter having a film of coloring matter in the three primary colors of red, green and blue, wherein the film of coloring matter in green has a ratio ($T_{485}/T_{610}$) of the transmittance at 485 nm ($T_{485}$) to that at 610 nm ($T_{610}$) of 3.5 or less, the maximum transmittance of the film of coloring matter in green is 60% or more and said maximum transmittance is assigned the wavelengths in a range of 540 to 550 nm, and (3) a color filter having a film of coloring matter in the three primary colors of red, green and blue, wherein the red (R) coloring matter is a single C.I. Pigment Red 168 or a single C.I. Pigment Red 177 or a mixed system pigment combining C.I. Pigment Red 168 with C.I. Pigment Yellow 110 or a mixed system pigment combining C.I. Pigment Red 177 with C.I. Pigment Yellow 110; the green (G) coloring matter is a mixed system pigment combining at least one compound selected from the group consisting of C.I. Pigment Green 7 and C.I. Pigment Green 36 with C.I. Pigment Yellow 110; and the blue (B) coloring matter is a mixed system pigment combining at least one compound selected from the group consisting of C.I. Pigment Blue 15:3, 15:4 and 15:6 with C.I. Pigment Violet 23. The present invention also provides a color filter as defined in (1) and (2) above, wherein preferably the C.I. Pigment Yellow 110 is used as a yellow pigment to adjust the color tone of either or both of red and green of organic pigments and a color filter as defined in (2) above, wherein preferably a mixture of C.I. Pigment Yellow 110 and C.I. Pigment Green 36 is used as a pigment to adjust the color tone of at least green of organic pigments.

The present invention further provides a method for manufacturing the color filter as defined in (1), (2) or (3) above, which comprises dispersing each of red, green and blue pigments in an aqueous medium by the use of a surfactant comprising a ferrocene derivative to prepare a dispersion, dipping into any one of the dispersions formed as above a substrate for manufacture of color filter which has a transparent electroconductive thin film on an electrically insulating substrate, electrifying said substrate to form a film of coloring matter on an electrode of said substrate; repeating the foregoing procedure successively for each of the remaining two dispersions; and thereby forming on said substrate the films of coloring matter in the three primary colors of red, green and blue. The present invention further provides the manufacturing method as defined above, which preferably comprises mixing a surfactant comprising a ferrocene derivative, an organic pigment and a supporting salt in an aqueous medium, dispersing said mixture for 0.5 hour or more per liter in the presence of ultrasonic waves by the use of a ultrasonic dispersing devices with an output of 300 W or more, centrifuging the dispersion formed above with a centrifugal force of 4000×g or more, and thus forming a dispersion containing organic pigment whose primary particles are classified to have an average particle size in the range of 20~200 nm and a particle size distribution within ±35 nm.

The present invention still further provides a liquid crystal projector using the color filter as defined in (1), (2) or (3) above.

BEST MODE FOR CARRYING OUT THE INVENTION

Figure 1:
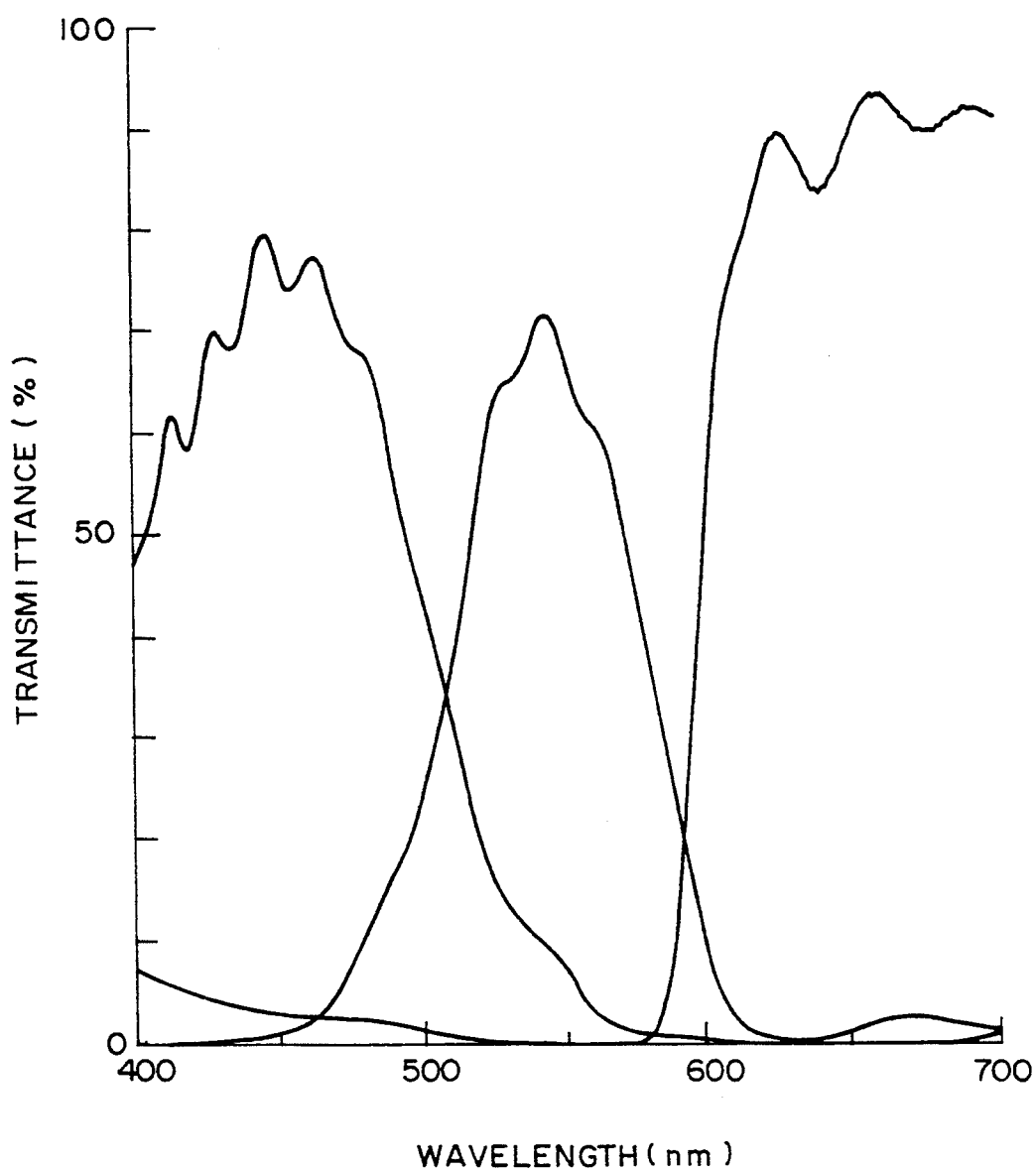
FIG. 1 is a graph showing spectral properties of the color filter obtained in Example 1.

The first color filters of the present invention have the films of coloring matter in the three primary colors of RGB. The film of coloring matter in each color of RGB comprises organic pigments whose primary particles have an average particle size in the range of 20~200 nm, preferably 20~150 nm and more preferably 20~100 nm and a particle size distribution within ±35 nm. These organic pigments have a color difference of 5 or less after said organic pigments as contained in color filter are subjected to exposure for 100 hours or more at an illuminance of 100,000 lux or more by the use of a highly bright light source for projection under the condition of a surface temperature at 50° C. or higher. Thus, these organic pigments are capable of withstanding the use of highly bright light sources.

The second color filters of the present invention have the films of coloring matter in the three primary colors of RGB, particularly comprising the color film in green having very good spectral properties. Said film of coloring matter in green has the ratio ($T_{485}/T_{610}$) of the transmittance at 485 nm ($T_{485}$) to that at 610 nm ($T_{610}$) of 3.5 or less, preferably 3.0 or less and more preferably 0.5~3.0, the maximum transmittance of the film of coloring matter in green is 60% or more, preferably 65% or more and more preferably 70% or more and said maximum transmittance is assigned the wavelengths in the range of 540~550 nm.

In these first and second color filters, the C.I. Pigment Yellow 110 (an isoindolinone-based pigment) as represented by the following formula:

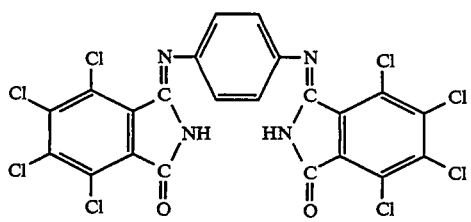

is used as a yellow pigment to adjust the color tone of either or both of red and green, enabling the color filters to exhibit excellent effects.

In said second color filters, a mixture of said C.I. Pigment Yellow 110 and C.I. Pigment Green 36 (a chlorobromocopperphthalocyanine-based pigment) as represented by the following formula:

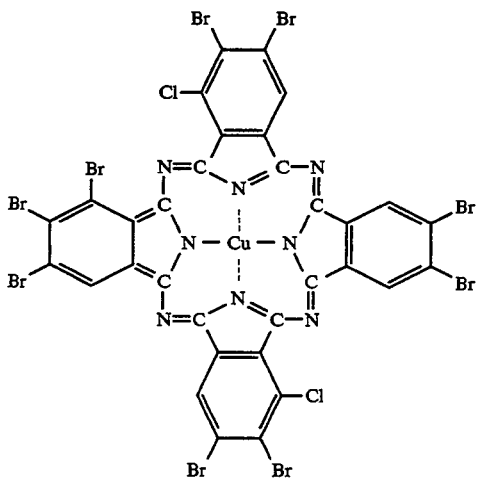

is used as a pigment to adjust the color tone of at least green, and thus said spectral properties can be obtained with ease. Furthermore, the third color filters of the present invention have the films of coloring matter in the three primary colors of RGB, and as the coloring matters in red, green and blue, each of following specific pigments should be used. As the red coloring matter, a single C.I. Pigment Red 168 (an anthanthron-based pigment) as represented by the following formula:

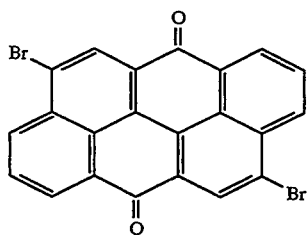

or a single C.I. Pigment Red 177 (a dianthraquinone-based pigment) as represented by the following formula:

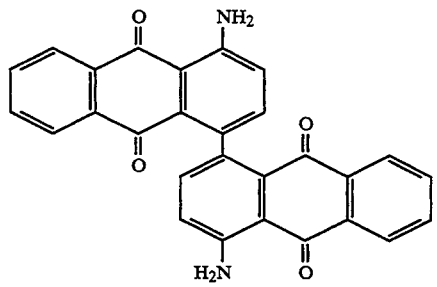

or a mixed system pigment combining said C.I. Pigment Red 168 with C.I. Pigment Yellow 110 or a mixed system pigment combining said C.I. Pigment Red 177 with C.I. Pigment Yellow 110 should be used.

It is preferable that these mixed systems of red pigment contain 50% or more by weight of C.I. Pigment Red 168 or C.I. Pigment Red 177.

As the green coloring matter, for example a mixed system pigment combining at least one compound selected from the group consisting of C.I. Pigment Green 7 (a chlorocopperphthalocyanine-based pigment) as represented by the following formula:

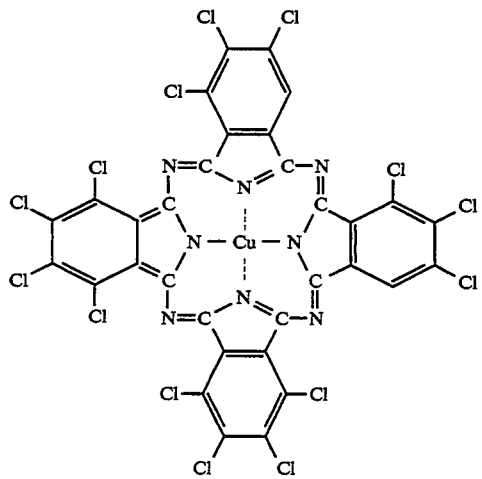

and said C.I. Pigment Green 36 with said C.I. Pigment Yellow 110 should be used. It is preferable that this mixed system of green pigment contain 40% or more by weight of the C.I. Pigment Green 7 or C.I. Pigment Green 36.

As the blue coloring matter, for example a mixed system pigment combining at least one compound selected from the group consisting of C.I. Pigment Blue 15:3, 15:4 and 15:6 (each being a chlorocopperphthalocyanine-based pigment) as represented by the following formula:

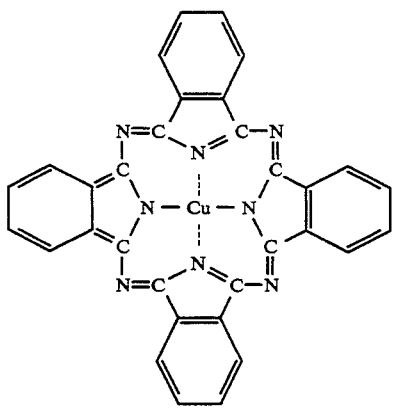

with C.I. Pigment Violet 23 (a dioxane-based pigment) as represented by the following formula:

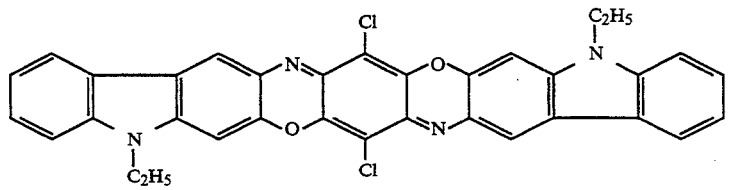

should be used. It is preferable that this mixed system of blue pigments contain 70% or more by weight of at least one compound selected from the group consisting of C.I. Pigment Blue 15:3, 15:4 and 15:6.

In so far as their films of coloring matter in the three primary colors of RGB are prepared from the red, green and blue pigments as defined above, the color filters having these color films in the three primary colors of RGB are excellent in light resistance, capable of withstanding the use of highly bright light sources and further superior in spectral properties.

The method for manufacturing the color filter of the present invention is not particularly limited. Any method can optionally be chosen from among those conventionally known, for example, the dyeing method, the printing method, the pigment dispersion method, the electrodeposition method, the vapor deposition method, the micellar disruption method and the like. Of them, however, the micellar disruption method is preferred. The color filters whose color films in the three primary colors of RGB are formed by the use of micellar disruption method have less depolarizing properties and further are excellent in heat resistance and light resistance because these color filters are free of binder resins.

The manufacture of the color filters according to the micellar disruption method is not particularly limited, but any conventionally known variations in the method my find their places. However, the color filters can be efficiently manufactured according to the following method of the present invention.

The method for manufacturing the color filter of the present invention will be described below. The method of the present invention comprises manufacturing the color filters by forming the films of coloring matter in the three primary colors of RGB on a transparent electroconductive thin film laid on a substrate for manufacture of color filter which is made of an electrically insulating substrate with said transparent electroconductive thin film thereon.

According to the method of the present invention, a red pigment, a green pigment and a blue pigment as desired are respectively dispersed in an aqueous medium by the use of a surfactant comprising a ferrocene derivative (a micelle forming agent) to prepare the dispersions. AS an aqueous medium used in this process, various media such as water, a mixture of water and alcohol, a mixture of water and acetone and so on can be mentioned.

As a ferrocene derivative used as a surfactant in preparing said dispersion, various ferrocene derivatives can be mentioned, including those of ammonium type, ether type, ester type and so on. Their typical examples include a FPEG represented by the following formula:

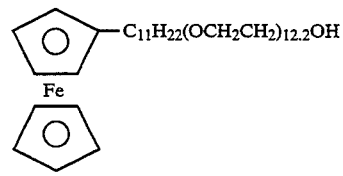

a FEST8 represented by the following formula:

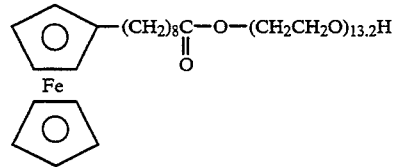

a FEST9 represented by the following formula:

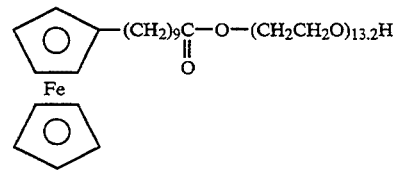

and a FTMA represented by the following formula:

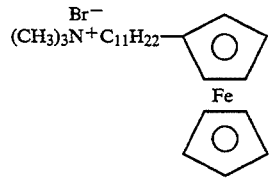

Mentioned below is the oxidation-reduction potential of these micelle forming agents comprising the ferrocene derivatives mentioned as above:

Oxidation-reduction potential:
FPEG: 0.25V
FEST8: 0.19V
FEST9: 0.22V
FTMA: 0.14V Besides those mentioned above, the method of the present invention can use the ferrocene derivatives produced according to the processes described in the specification of International Patent Application W089/01939, and in Japanese Patent Application Laid-Open No. 45370/1989, Japanese Patent Application Laid-Open No. 226894/1989, Japanese Patent Application Laid-Open No. 83387/1990, Japanese Patent Application Laid-Open No. 250892/1990 and the like.

As the surfactant used in the method of the present invention, said ferrocene derivatives may be used alone or as combination of at least two of them and, if necessary a combination of said Ferrocene derivatives with other surfactants may as well be used. As the other surfactant, for example nonionic surfactants such as polyoxyethylene alkyl ether, polyoxyethylene fatty acid ester, polyoxyethylene alkyl phenyl ether, polyoxyethylene polyoxypropylene alkyl ether and so on .can be preferably mentioned. Further, cationic and anionic surfactants such as alkyl sulfate, polyoxyethylene alkyl ether sulfate, alkyltrimethyl ammonium salt, fatty acid diethylaminoethylamide and so on can be used.

It is advantageous that the dispersions of pigment used in the method of the present invention be prepared in the following way. At first, a surfactant comprising a ferrocene derivative as mentioned above, an other surfactant as desired, various organic pigments and a supporting salt are placed and mixed in an aqueous medium. The resultant mixture is dispersed for 0.5 hour or more per liter, preferably 0.5~2 hours per liter in the presence of ultrasonic waves by the use of a ultrasonic dispersing device with an output of 50 W or more, preferably 300 W or more and more preferably 600 W or more. The dispersion formed as above is centrifuged with a centrifugal force of 4000×g or more and filtered if necessary to obtain a dispersion of organic pigments whose primary particles are classified to have an average particle size of 20~200 nm and a particle size distribution within ±35 nm.

The concentration of the surfactants used in the process is not particularly limited. Ordinarily, the concentration of said ferrocene derivative and that of the other surfactant used as desired are chosen from a range that exceeds the critical micelle concentration, preferably the range of the equilibrium of total critical micelle concentrations to 3 mmol/liter.

On the other hand, the concentration of each pigment is ordinarily chosen from the range of 1~500g/liter.

Said supporting salt is added to control the electrical conductivity. The amount of the supporting salt to be added may be the range that does not prevent the deposition of the pigments dispersed therein, but usually a concentration in the range of 0.01~2.00 mmol/liter is ordinarily chosen. Electrolysis may be carried out without using the supporting salt, and in this case, a high purity thin film free from supporting salt can be prepared.

Also, in the case of using the supporting salt, the kinds of the supporting salt are not particularly limited so long as it can control the electrical conductivity of the aqueous medium without preventing the formation of micelle or the deposition of said pigments on the electrode.

Specifically, sulfuric acid salts (salts of lithium, potassium, sodium, rubidium or aluminum), acetic acid salts (salts of lithium, potassium, sodium, rubidium, beryllium, magnesium, calcium, strontium, barium or aluminum), salts of halides (salts of lithium, potassium, sodium, rubidium, calcium, magnesium or aluminum), salts of water-soluble oxides (salts of lithium, potassium, sodium, rubidium, calcium, magnesium or aluminum), which are generally and widely used as supporting salts, are suitable. For example. LiBr, KCl, $Li_2SO_4$, $(NH_4)_3BF_4$ and so on can be mentioned.

Then, three kinds of dispersions wherein the red, green and blue pigments are respectively dispersed are prepared. A micelle dispersion comprising a mixed system of pigments can be prepared either by placing all the pigments to be incorporated simultaneously in the aqueous medium along with the surfactants and the supporting salts and dispersing these components or by placing a single pigment to be incorporated in the aqueous medium along with the surfactants and the supporting salt, dispersing these components to prepare a dispersion and mixing the three dispersions thus prepared.

Next, a substrate for manufacture of color filter comprising an electrically insulating substrate and a transparent electroconductive thin film thereon, for example an ITO (a composite oxide comprising indium oxide and tin oxide) substrate with a black matrix or a solid or patterned ITO substrate is dipped into one of the dispersions prepared as above. Said substrate is electrified to be subjected to the micellar electrolysis and the desired film of coloring matter is formed on the electrode of said substrate. This procedure is repeated for each of the remaining two dispersions to form a film of coloring matter in the three primary colors of RGB on said substrate. As the electrically insulating substrate used to prepare said substrate for manufacture of color filter, a glass substrate such as blue plate glass (soda lime), white plate glass, alkali-free glass (for example, 7059, produced by Corning Glass Works; NA 45, produced by HOYA CO., LTD.), low expansion glass (LE), quartz glass and so on and a plastic plate such as polyethylene terephthalate can be mentioned. Of them, the glass plates are suitable. As the glass plate, the polished products are preferable but even the unpolished glass plates can be used. The material of the transparent electroconductive thin film on these electrically insulating substrates is acceptable, provided it is a metal more noble than the oxidation potential of the ferrocene derivatives or an electrically conductive substance. More specifically, an electrically conductive metal oxide such as ITO (a composite oxide comprising indium oxide and tin oxide), tin dioxide and so on and further an electroconductive polymer can be mentioned. The thin films are formed according to, for example the sputtering method, the vapor deposition method, the CVD method, the coating method and so on. Further, it is advantageous to coat silica on a glass plate and then form an electroconductive thin film thereon, to provide improved adhesion between the electroconductive thin film and the glass plate.

As the substrate for manufacture of color filters, an ITO substrate with a black matrix is preferably used. The ITO substrate with black matrix is prepared by forming the black matrix on an electrically insulating substrate according to the photography method at first. The black matrix formed as above is subjected to patterning according to the photolithography method in the order of: (a) coating of a resisting agent, (b) exposure, (c) developing, (d) postbaking, (e) etching of an electroconductive thin film and (f) removal of the resist. Further, exposure should be carried out by the use of a mask for manufacturing the black matrix.

An electrically insulating film can additionally be laid on the substrate after the black matrix is formed thereon. The electrically insulating films are formed by sputtering silica ($SiO_2$), titania ($TiO_2$), alumina ($Al_2O_3$) and so on or coating or dipping silica or a polymer.

Then, an ITO thin film is formed on said electrically insulating film or glass plate. The ITO thin films can be formed according to the sputtering method, the vapor deposition method, the pyrosol method and so on.

Furthermore, the ITO thin films are patterned according to the photolithography method to form ITO electrodes. These ITO thin films are subjected to the patterning process according to the photolithography method by repeating the same procedure as in patterning of the electrically insulating thin films as set forth above. Moreover, the ITO electrodes are used as an electrode for forming layers of coloring matter, ordinarily having a stripe pattern.

In this way, the substrates for manufacture of color filter having the transparent electroconductive thin film on electrically insulating substrate is prepared.

In the present invention, said substrate for manufacture of color filter is dipped into one of said three dispersions and electrified to be subjected to the micellar electrolysis. The electrolytic conditions are determined depending on various circumstances. Usually, the liquid temperature is 0° to 90° C. and preferably 10° to 40° C., and the voltage is 0.03 to 1.5V and preferably chosen in the range of the oxidation-reduction potential to 0.9V.

Then, the procedure mentioned as above is repeated for each of the remaining two dispersions to obtain the film of coloring matter in the three primary colors of RGB on said substrate.

The micellar electrolytic treatment may as well be carried out according to the following method. On the substrates for manufacture of color filter, the patterned electroconductive thin films are divided into an objective electrode and other electrodes. The objective electrode is impressed with a potential higher than the oxidation-reduction potential of said micelle forming agent. At least one of the other electrodes is impressed with a potential in the range that does not permit the production of films including self potential (control potential). More specifically, control potential is lower than oxidation-reduction potential of said micelle forming agent.

When ferrocene derivatives are used as the micelle forming agent singly, and it is an FPEG, the objective electrode is impressed with potential of approximately +0.3 to +0.9V and the other electrodes are impressed with potential of approximately −0.3 to +0.28V. When it is a FEST8, the objective electrode and the other electrodes are respectively impressed with potential of 0.3 to +0.9V and −0.3 to +0.25V; when it is a FEST9, +0.3 to 0.9V and −0.3 to +0.25V; and when it is a FTMA, +0.2 to +0.9V and −0.3 to +0.20V.

Next, one embodiment of this method will be described below. In the substrates for manufacture of color filter having the R, G and B patterned transparent electrodes, when the film of coloring matter in R is formed from said red pigment at the R electrode, the R electrode is assigned as the objective electrode and the G and B electrodes as the other electrodes. Then, the dispersion containing said red pigment is subjected to an electrolytic treatment. Next, the G electrode is assigned as the objective electrode and the R and B electrodes as the other objective to electrolyze the dispersion containing said green pigment. Finally the B electrode is assigned as the objective electrode and the R and G electrodes as the other electrodes to electrolyze the dispersion containing said blue pigment, to form the film of coloring matter in the three primary colors of RGB on said substrate.

In this way, the films of coloring matter having a uniform thickness can be obtained according to the micellar disruption method.

In the present invention, the color films produced by this micellar electrolytic treatment are ordinarily rinsed with an electrical conductivity adjusting solution, pure water and an electrolyte. Then, they are dried with warm water and then prebaked at a temperature of approximately room temperature to 140° C. for about 5 to 30 minutes.

The thus produced films of coloring matter in the three primary colors of RGB are ordinarily provided with a protect coat to protect the surface of said color films. The protect coats can be formed by spin coating an acrylic, ester-based, polyimide-based, cyclized rubber-based, siloxane-based or epoxy-based homopolymer or copolymer and so on. Then, an ITO thin film is formed thereon by sputtering ITO according to a conventional method, followed by ITO patterning as directed by a conventional method. Thus, the desired color filters are obtained. Further, ITO sputtering can be replaced by subjecting ITO to the masking vapor deposition to dispense with the procedure for ITO patterning.

Prepared by the micellar electrolytic treatment according to the present invention, the color filters having the film of coloring matter in the three primary colors of RGB are excellent in spectral properties, having improved depolarizing properties. These color filters are also very excellent in heat resistance and light resistance since they are free of binder resins.

Next, the pigment dispersion method for manufacturing color filters, other than the method of the present invention, will briefly be described below.

In said pigment dispersion method, red, green and blue pigments as desired are respectively added to an appropriate organic solvent such as ethyl cellosolve acetate. Then, an acrylic or acrylic/acrylate-based resisting agent and a triazine-based initiator are added thereto. These components are mixed homogeneously by the use of a mixer, and the resultant mixture is subjected to the classification procedure comprising centrifugation and filtration (of Teflon or polypropylene), to prepare three kinds of pigment-dispersed resists of R, G and B. A pigment-dispersed resist comprising a mixed system of pigments can be prepared by either of the following two steps. One of them is to add all the pigments to be mixed to an organic solvent along with a resisting agent and an initiator simultaneously and disperse them. Another is to add a single pigment to be mixed to a organic solvent along with a resisting agent and an initiator, disperse them to obtain a pigment-based resist and mix a plurality of pigment-based resists thus produced.

In said pigment-dispersed resists, it is desired that the primary particles of the organic pigments be adjusted to have an average particle size of 20~200 nm and further a particle size distribution within ±35 nm. It is also desirable to choose the pigments and adjust their mixing ratio in a manner that the film of coloring matter in green has a ratio ($T_{485}/T_{610}$) of the transmittance at 485 nm ($T_{485}$) to that at 610 nm ($T_{610}$) of 3.5 or less, the maximum transmittance of said film of coloring matter in green is 60% or more and said maximum transmittance is assigned the wavelengths in the range of 540 to 550 nm.

Next, on the substrate for manufacture of color filter, for example the ITO substrate with black matrix, one of said pigment-dispersed resists is coated at a revolution of about 500~3000 rpm by the use of a spin coater or roll coater. The resultant coat is prebaked at a temperature of about room temperature to 150° C. for 5 to 60 minutes and then subjected to exposure by the use of a high-pressure mercury lamp and so on. The substrate is developed, rinsed and postbaked at a temperature of about 150° to 280° C. for about 30 to 150 minutes to form the desired film of coloring matter on said substrate. This procedure is repeated For each of the remaining two pigment-dispersed resists and thus the films of coloring matter in the three primary colors of RGB are prepared on said substrate.

Further on the color films formed as above, the protect coat (top coat) and the ITO thin film are provided and the resultant substrate is subjected to ITO patterning, by repeating the same procedure as in said micellar disruption method. In this way, the desired color filters are obtained.

The color filters of the present invention are excellent in light resistance, and when they are used in liquid crystal projectors, capable of withstanding the use of intensely bright light sources. These color filters are also resistant to the heat generated when the light is irradiated to the color filters From intensely bright light sources. Accordingly, liquid crystal projectors of single plate type using highly bright light sources will be made available with the advent of the color filters of the present invention. The liquid crystal panels for overhead projector and for car can use strong light sources because of the color filters of the present invention, to have higher reliability and a longer life.

As set forth above, the color filters of the present invention are very advantageous to liquid crystal projectors (liquid crystal television projectors, overhead projectors, video projectors and so on). Eventually one object of the present invention is to provide a liquid crystal projector using said color filter.

The present invention will be described in more detail below by the following examples, which are not to be construed as limiting the scope of the invention to their details.

PREPARATION EXAMPLES 1~12:

Preparation of the Dispersion for Micellar Disruption Method

In 5 L (L=liter) of pure water, lithium bromide was placed in a concentration of 0. 1mol/L and further thereto a surfactant comprising FPEG or FEST and a pigment in an amount and ratio listed in Table 1 were mixed with stirring. Under the condition of a liquid temperature at 30° C.±5° C., the resultant mixture was dispersed for a period of time listed in Table 1 in the presence of ultrasonic waves by the use of a continuous ultrasonic dispensing device (RUS-600T, 600 W, produced by NIHON Seiki Seisakusho), and then subjected to the treatments listed in Table 1, to prepare a dispersion. The dispersion thus obtained was centrifuged at a revolution and for a period of time as listed in Table 1 by the use of an angle rotor (RPR10-2, produced by Hitachi Koki Co., Ltd.) in a centrifuge (C20B2, produced by Hitachi Koki Co., Ltd.) under the condition of 25° C., to classify the particles of pigments. This centrifuge had a centrifugal force of 12600×g at 9500rpm and 6200×g at 8000rpm. The primary particles of pigment contained in the dispersions formed as above were observed for their particle size distribution by the use of a transmission electron microscope (H-800, produced by Hitachi, Ltd.). The results are given in Table 1 in terms of weight average particle size and the range of particle size distribution with respect to the primary particles.

TABLE 1

| Example | C.I. No. | Brandname | Pigment concentration (g/l) | Surfactant concentration (mmol/l) | Kind |
|---|---|---|---|---|---|
| 1 | P.R. 168 | Monolight Red 2Y[4)] | 45.2 | 9.05 | FEST8 |
| 2 | P.R. 177 | Chromophthal Red A2B[1)] | 22.6 | 4.66 | FEST9 |
| 3 | P.G. 7 | Fastgen Green S[3)] | 29.7 | 5.97 | FPEG |
| 4 | P.G. 36 | Heliogen Green L9361[2)] | 29.7 | 5.64 | FEST9 |
| 5 | P.G. 36 | Heliogen Green L9361[2)] | 29.7 | 5.64 | FEST9 |
| 6 | P.Y. 110 | Irugazine Yellow 2RLT[1)] | 66.0 | 12.3 | FEST9 |
| 7 | P.Y. 110 | Irugazine Yellow 2RLT[1)] | 66.0 | 12.3 | FEST9 |
| 8 | P.Y. 83 | Similar Fast Yellow 4181[3)] | 33.0 | 7.68 | FEST9 |
| 9 | P.Y.83 | Similar Fast Yellow 4181[3)] | 33.0 | 7.68 | FEST9 |
| 10 | P.B. 15:3 | Fastgen Blue TGR[3)] | 13.8 | 2.94 | FEST9 |
| 11 | P.B. 15:6 | Fastgen Blue EP-7[3)] | 55.0 | 10.7 | FPEG |
| 12 | P.V. 23 | Fastgen Super Violet 2RN[3)] | 9.75 | 2.34 | FEST9 |

| Example | Treatments | Weight average particle size (nm) | Range of particle size distribution (nm) |
|---|---|---|---|
| 1 | Ultrasonic wave, 18 hr.: Centrifugation, 9500 rpm, 17.5 min. | 82.3 | +23.5 −26.8 |
| 2 | Ultrasonic wave, 18 hr.: Centrifugation, 9500 rpm, 17.5 min. | 41.2 | +33.8 −26.2 |
| 3 | Ultrasonic wave, 18 hr.: Centrifugation, 9500 rpm, 17.5 min. | 34.3 | +28.3 −25.7 |
| 4 | Ultrasonic wave, 24 hr.: Centrifugation, 8000 rpm, 17.5 min. | 22.4 | +20.5 −13.3 |
| 5 | Ultrasonic wave, 24 hr.: No centrifugation | 34.2 | +66.2 −25.6 |
| 6 | Ultrasonic wave, 24 hr.: No centrifugation | 52.4 | +40.2 −36.4 |
| 7 | Ultrasonic wave, 24 hr.: Centrifugation, 9500 rpm, 35.0 min. | 34.8 | +29.5 −21.1 |
| 8 | Ultrasonic wave, 18 hr.: No centrifugation | 54.6 | +61.8 −45.1 |
| 9 | Ultrasonbic wave, 18 hr.: Centrifugation, 9500 rpm, 35.0 min. | 39.45 | +34.5 −26.6 |
| 10 | Ultrasonic wave, 12 hr.: Centrifugation, 9500 rpm, | 44.95 | +24.9 −34.8 |

TABLE 1-continued

| | | | | |
|---|---|---|---|---|
| 11 | 17.5 min. Ultrasonic wave, 18 hr.: Centrifugation, 9500 rpm, 35.0 min. | 48.5 | +26.9 | −30.2 |
| 12 | Ultrasonic wave, 12 hr.: Centrifugation, 9500 rpm, 17.5 min. | 49.2 | +34.1 | −32.6 |

Note:
[1] Ciba Geigy Co
[2] BASF Co.
[3] DAINIPPON INK & CHEMICALS INC.
[4] ICI Co.

PREPARATION EXAMPLES 13~20:

Preparation of Resisting Agent for Dispersion Method

ECA (ethyl cellosolve acetate), a dispersing aid, a sorbitan fatty acid ester compound and a pigment were mixed and dispersed by a sandmill. Then, the mixture was subjected to the treatments listed in Table 2 to prepare a dispersion. The amount of the pigments added is summarized in Table 2. The pressure filtration was carried out by the use of a filter of Teflon having an average pore size of 0.45 μm.

The primary particles of pigment contained in the dispersion formed as above were observed for their particle size distribution by the use of a transmission electron microscope (H-800, produced by Hitachi, Ltd.). The results are given in Table 2 in terms of weight average particle size and the range of particle size distribution with respect to the primary particles of organic pigments. Furthermore, to 1 L of said dispersion, 1 L of a solution of a resin of ultraviolet setting type dissolved in the ECA solvent (CT: produced by Fuji Hunt Electronics Technology Co., Ltd.; concentration of solids of 20% by weight) was added and both of them were mixed sufficiently to prepare a resisting solution.

TABLE 2

| | Kind of Pigment | | Concentration of pigment |
|---|---|---|---|
| Example | C.I. No. | Brandname | (g/l) |
| 13 | P.R. 177 | Chromophthal Red A2B[1] | 113 |
| 14 | P.G. 36 | Heliogen Green L9361[2] | 149 |
| 15 | P.Y. 110 | Irugazine Yellow 2RLT[1] | 165 |
| 16 | P.Y. 110 | Irugazine Yellow 3RLTN[1] | 145 |
| 17 | P.Y. 139 | Pariothol Yellow L1820[2] | 124 |
| 18 | P.Y. 139 | Pariothol Yellow L1820[2] | 124 |
| 19 | P.B. 15:6 | Lionol Blue B-ES[5] | 68 |
| 20 | P.v. 23 | Fastgen Super Violet RN[3] | 48 |

| Example | Treatments | Weight average Particle size (nm) | Range of particle size distribution (nm) |
|---|---|---|---|
| 13 | Pressure filtration | 93.7 | +28.3 −33.7 |
| 14 | Pressure filtration | 45.3 | +24.7 −23.3 |
| 15 | Pressure filtration | 45.2 | +29.5 −19.8 |
| 16 | No treatment | 118.4 | +68.2 −42.5 |
| 17 | Pressure filtration | 58.4 | +31.6 −28.4 |
| 18 | No treatment | 74.2 | +62.3 −44.3 |
| 19 | Pressure filtration | 60.2 | +31.4 −27.2 |
| 20 | Pressure filtration | 59.9 | +31.6 −26.9 |

Note:
[1] Ciba Geigy Co.
[2] BASF Co.
[3] DAINIPPON INK & CHEMICALS, INC.
[4] TOYO INK MFG. CO., LTD.

EXAMPLE 1:

Process for Patterning ITO Substrate

On a glass substrate having a face resistance of 20Ω/□ (blue plate glass, polished, silica-dipped material, produced by Geomatec Co., Ltd.), a resisting agent of ultraviolet setting type (FH22130, produced by Fuji Hunt Electronics Technology Co., Ltd.) was spin coated at a revolution of 1000rpm. After spin coating, said resist/ITO substrate was prebaked at 80° C. for 15 minutes, and then, set to an exposer. By the use of a mask for pattern of 1920 strips in length, 100 μm in line width, 20 μm in gap, 230 μm in line length, a high-pressure mercury lamp of 2kW, and with a proximity gap of 70 μm, the substrate was subjected to an exposure at 120 mJ/cm$^2$. Then, the substrate was developed with a developer (FHD-5, produced by Fuji Hunt Electronics Technology Co., Ltd.), rinsed with pure water, and postbaked at 180° C. Next, an aqueous solution of 1M FeCl$_3$.6N HCl.0.1N HNO$_3$.0.1N Ce(NO$_3$)$_4$ was prepared as an etching solution, and ITO of said substrate was subjected to etching with the etching solution. The end point of etching was determined by electric resistance. Said etching took a period of about 20 minutes.

After etching the substrate was rinsed with pure water, and the resist was removed with 1N NaOH.

Thus, ITO patterned glass substrates were prepared.

Process for Forming Black Matrix

Subsequently, as a resisting agent for forming a black matrix, a mixture of CK with CR, CG, and CB of Color Mosaic series (produced, by Fuji Hunt Electronics Technology Co., Ltd.) each in the amount of 3:1:1:1 by weight was used. The ITO patterned glass substrate formed as above was revolved at 10rpm, 30 cc of this resisting agent was sprayed on it, and then the revolution of the spin coater was raised to 500 rpm, to form a uniform film on the substrate. The substrate after spin coating was prebaked at 80° C. for 15 minutes. By the use of a mask designed for black matrix (90×310 μm square.20 μm in line width), while positioning adjusting with an exposer having a high-pressure mercury lamp of 2 kW and also alignment function, said substrate was subjected to exposure. As the light source, a high-pressure mercury-vapor lamp of 2 kW was used, with a proximity gap of 70 μm, and subjected to exposure at 100mJ/cm$^2$. Then, the substrate was developed with an alkali developer. Then, Fuji Hunt CD (a developer) was diluted with pure water 4-fold, and the substrate was developed with the diluent again for 30 seconds, rinsed with pure water and postbaked at 200° C. for 100 minutes.

Process for Preparing Dispersion

As the dispersion of R, the dispersion of Chromophthal Red A 2B (produced, by Ciba Geigy Co., Ltd.) prepared in Preparation Example 2 was used.

Also, as the mixed dispersion of G, the dispersion of Heliogen Green L9361 (produced by BASF Co., Ltd.) prepared in Preparation Example 4 was mixed with the dispersion of Irugazine Yellow-2RLT (produced by Ciba Geigy Co., Ltd.) in a ratio of 70:30 by weight, the mixture was dispersed for 30 minutes by the use of a ultrasonic homogenizer, and the mixture thus homogenized was used.

Further, as the mixed dispersion of B, the dispersion of Fastgen Blue-TGR (produced by DAINIPPON INK & CHEMICALS, INC.) prepared in Preparation Example 10 was mixed with the dispersion of Fastgen Super Violet 2RN (produced by DAINIPPON INK & CHEMICALS, INC.) in a ratio of 80:20 by weight and the resultant mixture was used.

Process for Preparing Film of Coloring Matter

Into said dispersion of R, said ITO patterned substrate was dipped, and a potentiostat was connected to line R of the stripe, subjected to a constant potential electrolysis of 0.5V vs. SCE, for 25 minutes, to obtain a thin film of color filter R. The thin film was washed with pure water, and baked in an oven at 100° C. for 15 minutes.

Next, this substrate was dipped into said dispersion of G, and subjected to a constant potential electrolysis of 0.5V vs. SCE, for 20 minutes, to obtain a thin film of color filter RG. After film forming, the thin film was subjected to the after treatment under the same conditions as in R.

Lastly, this substrate was dipped into said dispersion of B and subjected to a constant potential electrolysis of 0.5V vs. SCE, for 15 minutes, to obtain a thin film of color filter RGB. The thin film was subjected to the after treatment under the same conditions as in R. Thus, color filter films of RGB were prepared.

Formation of Protect Coat

Said substrate with the color film thereon was set to a spin coater, and OS-808 (produced by NAGASE & CO., LTD.) as a top coating agent was sprayed on it by the use of a dispenser. Thereupon, the substrate was slowly revolved at 10 rpm, to coat evenly all over the substrate. Then, the revolution was raised and the substrate was revolved at 800 rpm for 2 minutes to obtain a uniform thin film. The thin film was postbaked at 260° C. for 2 hours and cured. Thus, color filters RGB having protect coat were prepared.

Results of Evaluation

(1) Evaluation of Light Resistance

This color filter was broken into about 5cm-long pieces, and one piece of them was used to determine chromaticity coordinates for each color of RGB and spectral properties (FIG. 1) of said piece were measured according to TC-1800DAM (produced by Tokyo Denshoku Co., Ltd.). Then, the light was irradiated to this piece of the color filter at a illuminance of 1,000,000 lux For 100 hours by the use of a metal halide lamp of 160 W. Thereon, the surface temperature was found to be 30° C.

The results are given in Table 3. It was found that the color difference $\Delta Eab$ of each color of RGB remained almost unchanged before and after the irradiation of the light. The color difference determined according to TC-1800DAM (produced by Tokyo Denshoku Co., Ltd.) is expressed in terms of $\Delta Eab$ of the Lab system (JIS Z-8730).

(2) Evaluation of Depolarizing Properties

Two polarizers running side by side were turned around to proceed one polarized light in the direction forming an angle of 90° with the direction of another polarized light, and the ratio of brightness before and after the turnabout (contrast) was found to be 2000. Next, another piece of the color filter was placed between these two polarizers. The polarizers were likewise turned around to proceed the two polarized lights in the directions forming an angle of 90° one another and the ratio of brightness before and after the turn-around were determined. As the result, it was found that, among RGB, R had the lowest ratio of brightness of 909, to mark a striking contrast as compared with conventional color filters.

EXAMPLE 2:

Formation of Black Matrix

On an alkali-free glass substrate (NA45/300 square, 1.1 mm thick, produced by HOYA Co., Ltd.), Cr was sputtered to form a Cr thin film of about 2000A (SDP-550VT, produced by Alback Co., Ltd.). Further on it, a resisting agent of positive type (FH-2130, produced by Fuji Hunt Electronics Technology Co., Ltd.) was spin coated at a revolution of 1000 rpm. After spin coating, this resist/Cr/glass substrate was prebaked at 80° C. for 15 minutes and then set to a stepper exposer. By the use of a mask for picture element of 90 $\mu m \times 310$ $\mu m$, 20 $\mu m$ in line width and a quarter of grill pattern having an effective area of 160 mm $\times 155$ mm, the substrate was subjected to an exposure at an exposure capacity of 100mJ/cm$^2$ and an scanning speed of 5 mm/second. Then, the substrate was developed with an exclusive developer, rinsed with pure water and postbaked at 150° C. Next, an aqueous solution of 1N HClO$_4$.0.1N HNO$_3$.0.1N Ce(NO$_3$)$_4$ was prepared as an etching solution, and Cr of said substrate was subjected to etching with the etching solution. The end point of etching was determined by electric resistance. Said etching took a period of 20 minutes. After etching, the substrate was rinsed with pure water, and the resist was removed with 1N NaOH. Said substrate was rinsed well with pure water, and thus black matrixes (BM) were prepared.

Formation of Electrically Insulating Film and ITO Thin Film Electrode

Subsequently, on this BM, OCD TYPE-7 (silica, produced by Tokyo Ohka Kogyo Co., Ltd.) was spin coated as an electrically insulating film at a revolution of 1000 rpm, baked at 250° C. for 60 minutes and cooled to room temperature. Then, the substrate was set to SDP-500VT (produced by ULVAC Co., Ltd.), and ITO was sputtered from above the substrate to form an ITO film of about 1700 Å. Thereon, the ITO was adjusted to have a surface resistance of 20Ω/□ at a work temperature of 180° C. On this ITO film/Cr/glass substrate (NA45, 300 square, produced by HOYA Co., Ltd.), a resisting agent of positive type (FH-2130, produced by Fuji Hunt Electronics Technology Co., Ltd.) was spin coated at a revolution of 1000 rpm. After spin coating, this resist/ITO/Cr/glass substrate was prebaked at 80° C. for 15 minutes and set to a contact exposer. By the use of a mask for stripe pattern in length of 92 μm in line width, 18 μm in gap, 155 mm in line length, a high-pressure mercury lamp of 2 kW and while aligning, and with a proximity gap of 50 μm, the substrate was subjected to an exposure at 120mJ/cm$^2$. Then, said substrate was developed with 2.1 wt % of TMAH (tetramethyl ammonium hydride) as an alkali developer, rinsed with pure water and postbaked at 150° C. Next, an aqueous solution of 1M FeCl$_3$.1N HCL.0.1N HNO$_3$.0.1N Ce(NO$_3$)$_4$ was prepared as an etching solution, and ITO of said substrate was subjected to etching with the etching solution. Said etching took a period of 20 minutes. After etching, the substrate was rinsed with pure water and the resist was removed with 1N NaOH. Then, said substrate was rinsed with pure water, and no electrical leak was confirmed between two adjacent ITO electrodes. Thus, substrates with ITO patterned BM were prepared.

Formation of Taken-out Electrode Mounting

As a taken-out electrode mounting, an acrylic resisting agent (CT, produced by Fuji Hunt Electronics Technology Co., Ltd.) was used.

The substrate having an ITO patterned BM as obtained in the preceding process was revolved at 10 rpm, 30 cc of said resisting agent was sprayed on it and the revolution of the spin coater was raised to 1500 rpm to form a uniform film on the substrate. This substrate was prebaked at 80° C. for 15 minutes. By the use of a mask designed to prepare only parts of taken-out electrode mounting (see FIG. 5), while positioning with a contact exposer having a high-pressure mercury lamp of 2 kW and also alignment function, said substrate was subjected to an exposure. Then, the substrate was developed with a developer for 90 minutes, rinsed with pure water and postbaked at 180° C. for 100 minutes. Thus, substrates for manufacturing color filters were completed.

Process for Preparing Dispersion

As the mixed dispersion of R, the dispersion of Chromophthal Red A 2B (produced by Ciba Geigy Co.) prepared in Preparation Example 2 was mixed with the dispersion of Irugazine Yellow 2RLT (produced by Ciba Geigy Co.) prepared in Preparation Example 7 in a ratio of 65:35 by weight, and the resultant mixture was dispersed for 30 minutes by the use of a ultrasonic homogenizer. Thus, the mixed dispersion of R formed as above was used.

Also, as the mixed dispersion of G, the dispersion of Heliogen Green L9361 (produced by BASF Co.) prepared in Preparation Example 4 was mixed with the dispersion of Irugazine Yellow 2RLT (produced by Ciba Geigy Co.) prepared in Preparation Example 7 in a ratio of 70:30 by weight, and the resultant mixture was dispersed for 30 minutes by the use of a ultrasonic homogenizer, and thus, the mixed dispersion of G formed as above was used.

Furthermore, as the mixed dispersion of B, the dispersion of Fastgen Blue TGR (produced by DAINIPPON INK & CHEMICALS, INC.) prepared in Preparation Example 10 was mixed with the dispersion of Fastgert Superviolet 2 RN (produced by DAINIPPON INK & CHEMICALS, INC.) prepared in Preparation Example 12 in a ratio of 80:20 by weight, and thus, the mixture of B formed as above was used.

Process for Preparing Film of Coloring Matter

Into said dispersion of R, said patterned ITO substrate was dipped, and a potentiostat was connected to line R of the stripe, subjected to a constant potential electrolysis of 0.5V vs. SCE for 25 minutes, to obtain a thin film of color filter R. The thin film was washed with pure water and baked in an oven at 100° C. for 15 minutes.

Next, this substrate was dipped into said dispersion of G and subjected to a constant potential electrolysis of 0.5V vs. SCE for 20 minutes, to obtain a thin film of color filter RG. Then, the thin film was subjected to the after treatment under the same conditions as in R.

Lastly, this substrate was dipped into said dispersion of B and subjected to a constant potential electrolysis of 0.5V vs. SCE for 15 minutes to obtain a thin film of color filter RGB. Then, the thin film was subjected to the after treatment under the same conditions as in R.

Thus, color thin films of color filter RGB were prepared.

Formation of Protect Coat

Subsequently, the RGB color filter substrate formed as above was revolved at 10 rpm, 30 cc of SS-7265 (produced by Japan Synthetic Rubber Co., Ltd.) as a topcoating agent was sprayed on it and the revolution of the spin coater was raised to 1000 rpm to obtain a uniform film on the substrate (the color thin film of RGB color filter). Then, this thin film was postbaked at 220° C. for 50 minutes.

Result of Evaluation

The result of evaluation conducted in the same manner as Example 1 is shown in Table 3.

EXAMPLE 3 AND COMPARATIVE EXAMPLE 1:

The color filter was prepared in the same manner as in Example 2 except that the pigment dispersions prepared as listed in Table 3 were used in place of the micellar electrolytes of RGB. The result is shown in Table 3.

TABLE 3

| | Preparation Example (Mixing Ratio by Weight) | | |
|---|---|---|---|
| | R | G | B |
| Example 1 | 2 (100) | 4/7(70:30) | 10/12(80:20) |
| Example 2 | 2/7(65:35) | 4/7(70:30) | 10/12(80:20) |
| Example 3 | 1/7(65:35) | 3/7(70:30) | 10/12(80:20) |
| Comp. Example 1 | 2/7(65,35) | 5/6(85:15) | 10/12(80:20) |

| | Color difference ΔEab (before/after) | | | |
|---|---|---|---|---|
| | R | G | B | Contrast |
| Example 1 | 0.7 | 1.2 | 1.1 | 909 |
| Example 2 | 1.1 | 0.6 | 1.3 | 1111 |
| Example 3 | 1.0 | 0.9 | 1.3 | 930 |
| Comp. Example 1 | 1.2 | 22.5 | 1.3 | — |

EXAMPLE 4:

Formation of Black Matrix

On an alkali-free glass substrate (NA 45/300 square, 1.1 mm thick, produced by HOYA Co., Ltd.), Cr was sputtered to form a Cr thin film of about 2000A (SDP-550VT, produced by ULVAC Co.), and further thereon a resisting agent of positive type (FH-2130, produced by Fuji Hunt Electronics Technology Co., Ltd.) was spin coated at a revolution of 1000 rpm. After spin coating, said resist/Cr/glass substrate was prebaked at 80° C. for 15 minutes and then set to a stepper exposer. By the use of a mask for picture element of 90 μm×310 μm, 20 μm in line width, a quarter of grill pattern having an effective area of 160 mm×155 mm, said substrate was subjected to exposure of i-line. The exposure was carried out at a scanning speed of 5mm/second and at an exposure capacity of 120mJ/cm² and then the substrate was developed with an exclusive developer. After being developed, said substrate was rinsed with pure water and postbaked at 150° C. Subsequently, an aqueous solution of 1N $HClO_4.0.1N$ $HNO_3.0.1N$ $Ce(NO_3)_4$ was prepared as an etching solution, and Cr of said substrate was etched with the etching solution. Said etching took a period of 20 minutes. After etching, the substrate was rinsed with pure water, and the resist was removed with 1N NaOH. Said substrate was rinsed well with pure water, and thus black matrixes (BM) were completed.

Formation of electrically insulating Film

Next, on this BM, CCD TYPE-7 (silica, produced by Tokyo Ohka Kogyo Co., Ltd.) was spin coated as an electrically insulating film at a revolution of 1000 rpm.

This electrically insulating film was baked at 250° C. for 60 minutes and cooled to room temperature.

Process for Preparing Pigment-dispersed Resist and Forming Film

Said substrate having a CrBM was revolved at 10 rpm, 30 cc of the resisting agent of R prepared in Preparation Example 13 was sprayed on it and then the revolution of the spin coater was raised to 500 rpm to form a uniform film on the substrate. The substrate was prebaked at 80° C. for 15 minutes. By the use of a mask designed for stripe of R, while positioning with an exposer having a high-pressure mercury lamp of 2 kW and also alignment function, said substrate was subjected to exposure. Then, the substrate was developed for 30 seconds with a developer which was prepared by diluting the Fuji Hunt CD (a developer) with pure water 4-fold, rinsed with pure water and postbaked at 200° C. for 100 minutes.

Next, the dispersion of Preparation Example 14 was mixed with the dispersion of Preparation of Example 15 in a ratio of 7:3 by weight to prepare the resisting agent of G. Said BM substrate having the R resist as formed above was revolved at 10 rpm, 30 cc of the resisting agent of G was sprayed on it and then the revolution of the spin coater was raised to 500 rpm to form a uniform film on the substrate. The substrate was prebaked at 80° C. for 15 minutes. By the use of a mask designed for stripe of G, while positioning with an exposer having a high-pressure mercury lamp of 2 kW and also alignment function, said substrate was subjected to exposure. Then, the substrate was developed for 30 seconds with a developer which was prepared by diluting the Fuji Hunt CD (a developer) with pure water 4-fold, rinsed with pure water and postbaked at 200° C. for 100 minutes.

Subsequently, the dispersion of Preparation Example 19 was mixed with the dispersion of Preparation Example 20 in a ratio of 9:1 by weight to prepare a resisting agent of B. Said BM substrate having the RG resists as formed above was revolved at 10 rpm, 30 cc of the resisting agent of B was sprayed on it and then the revolution of spin coater was raised to 500 rpm to form a uniform film on the substrate. The substrate was prebaked at 80° C. for 15 minutes. By the use of a mask designed for stripe of B, while positioning with an exposer having a high-pressure mercury lamp of 2 kW and also alignment function, said substrate was subjected to exposure. Then, the substrate was developed for 30 seconds with a developer which was prepared by diluting the Fuji Hunt CD (a developer) with pure water 4-fold, rinsed with pure water and postbaked at 200° C. for 100 minutes.

In this way, color filter thin films of RGB were prepared.

Formation of Protect Coat

Next, the RGB color filter substrate formed as above was revolved at 10 rpm, 30 cc of JSS-715 (produced by Japan Synthetic Rubber Co., Ltd.) as a topcoating agent was sprayed on it and the revolution of the spin coater was raised to 1000 rpm to form a uniform film on the substrate (the RGB color thin film of color filter).

Then, the thin film was postbaked at 220° C. for 90 minutes.

Result of Evaluation

The result of evaluation conducted in the same manner as Example 1 is shown in Table 4.

Comparative Example 2

Figure 2:
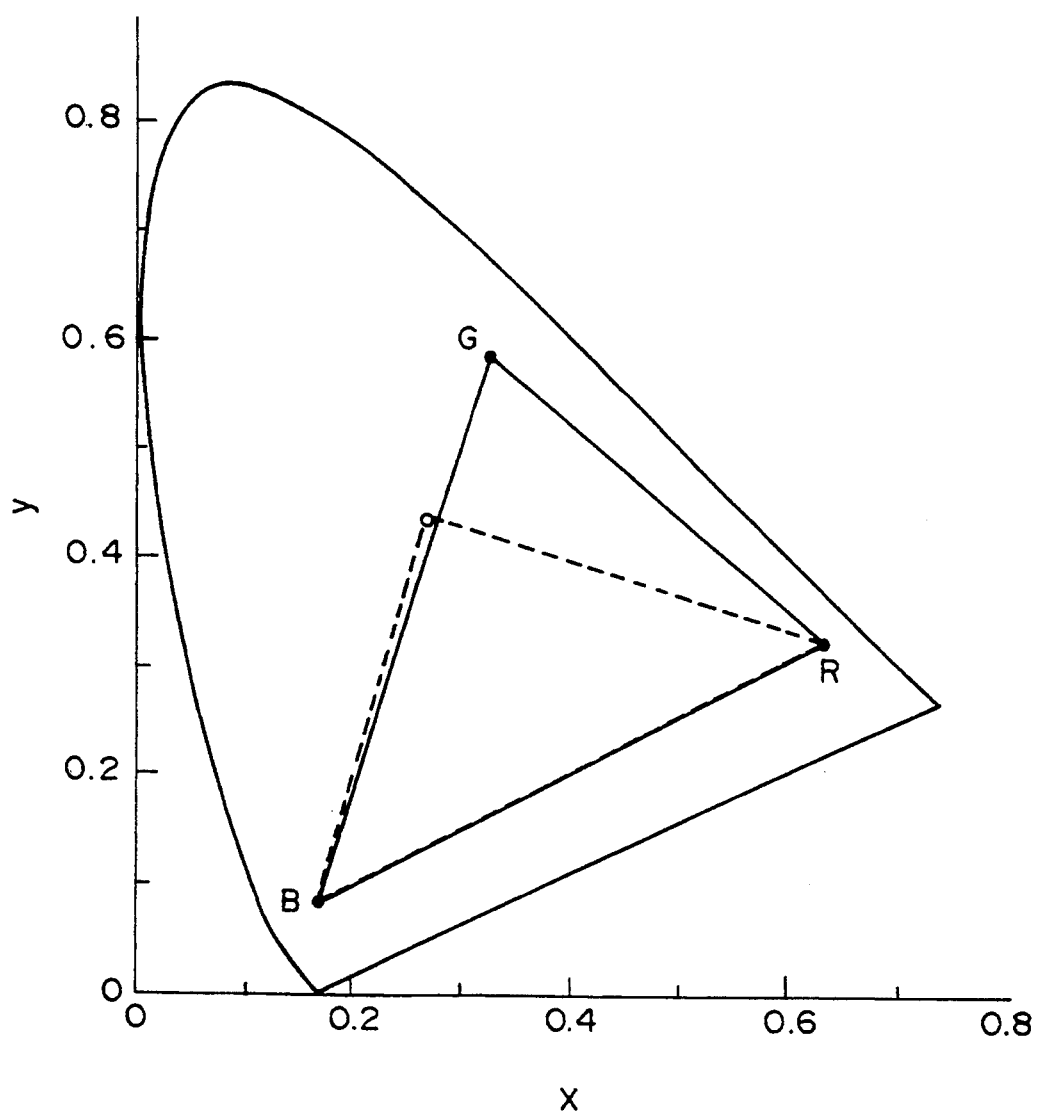
FIG. 2 is a graph showing the chromaticity coordinates before and after the light was irradiated to the color filter obtained in Comparative Example 2.

The color filter was prepared in the same manner as in Example 4 except that pigment-dispersed resists prepared as listed in Table 4 were used in place of the pigment-dispersed resist of Example 4. The results are shown in Table 4. Further, the chromaticity coordinates before (solid line) and after (dotted line) the irradiation of light are shown in FIG. 2.

TABLE 4

| | Preparation Example (Mixing Ratio by Weight) | | |
|---|---|---|---|
| | R | G | B |
| Example 4 | 13 (100) | 14/15 (70:30) | 19/20 (90:10) |
| Comp. Example 2 | 13 (100) | 14/18 (70:30) | 19/20 (90:10) |

| | Color difference $\Delta Eab$ (before/after) | | | |
|---|---|---|---|---|
| | R | G | B | Contrast |
| Example 4 | 0.9 | 1.1 | 3.0 | 526 |
| Comp. Example 2 | 1.0 | 39.4 | 2.9 | 432 |

These results clearly demonstrate that, as the kinds of organic pigments and their combinations, it is effective to use the single C.I.P.R. 168, the single C.I.P.R. 177, the mixed system pigment combining C.I.P.R. 168 with C.I.P.Y. 110 or the mixed system pigment combining C.I.P.R. 177 with C.I.P.Y. 110 for red (R); the mixed system pigment combining C.I.P.G.7 or C.I.P.G.36 with C.I.P.Y. 110 for green (G); and the mixed system pigment combining C.I.P.B. 15:3 or 15:4 or 15:6 with C.I.P.V. 23 for blue (B).Examples 5~8:

To produce the color filter in green, the dispersions of Preparation Example 4 and Preparation Example 7 were mixed under the conditions listed in Table 5, to prepare a dispersion. Into this dispersion, a transparent electrode substrate having a face resistance of 20Ω/□(a 1.1t thick, blue plate glass, produced by Diomatech Co.) as an ITO fill was dipped, and a platinum electrode was used as the counter electrode, subjected to a film-forming treatment for 15 minutes at a potential of 0.5V vs. SEE, to form a fill of coloring matter. This color fill substrate was washed well with pure water and dried. Said substrate was revolved at 10 rpm, 30 cc of SS-7265 (produced by Nippon Synthetic Rubber Co., Ltd.) as a topcoating agent was sprayed on it and the revolution of the spin coater was raised to 1000 rpm, to obtain a uniform coat on the thin fill substrate. The resultant substrate was postbaked at 220° C. for 50 minutes.

Figure 5:
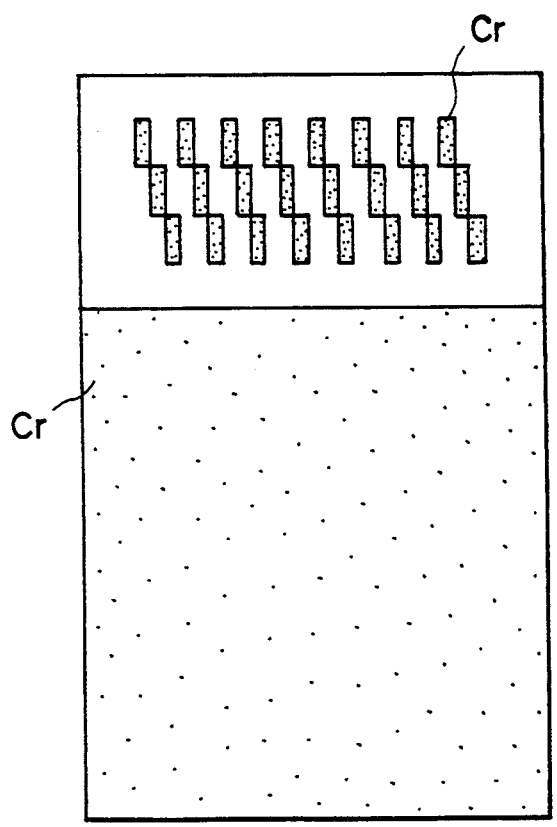
FIG. 5 is a schematic diagram illustrating a mask designed to prepare a taken-out electrode mounting.

The thin fill substrate thus produced was determined for its ratio ($T_{485}/T_{610}$) of the transmittance of 485 nm ($T_{485}$) to that of 610 nm ($T_{610}$), the maximum transmittance ($T_{MAX}$) of the color fill and the wavelength ascribed to said maximum transmittance ($\lambda_{MAX}$). The results are shown in FIG. 5.

It was found that the transmitted light at 485 nm or shorter was shielded by the shielding Capability of yellow pigments and the transmitted light at 610 nm or longer was shielded by the shielding capability of green pigments and thus that the ratio of transmittance of 485 nm to that of 610 nm was controlled to be 3.5 or less.

It was also found that the green had the maximum transmittance of 60% or more and that the maximum transmittance of the green was assigned the wavelengths in the range of 540 to 550 nm ($\lambda_{MAX}$). Thus, color films in green having ideal spectral properties can be obtained by choosing the appropriate pigments, adjusting their mixing ratios and classifying their particles.

TABLE 5

| | Preparation Example (Mixing Ratio by Weight) | $T_{485}$ | $T_{610}$ |
|---|---|---|---|
| Example 5 | 4/7 (50:50) | 8.9 | 15.9 |
| Example 6 | 4/7 (60:40) | 7.9 | 12.6 |
| Example 7 | 4/7 (70:30) | 15.1 | 5.1 |
| Example 8 | 4/7 (75:25) | 17.1 | 4.9 |

| | $T_{485}/T_{610}$ | $T_{MAX}$ (%) | $MAX$ (nm) |
|---|---|---|---|
| Example 5 | 0.56 | 77 | 548 |
| Example 6 | 0.67 | 78 | 545 |
| Example 7 | 2.96 | 79 | 543 |
| Example 8 | 3.45 | 79 | 540 |

EXAMPLES 9, 10 AND COMPARATIVE EXAMPLES 3~6

Figure 3:
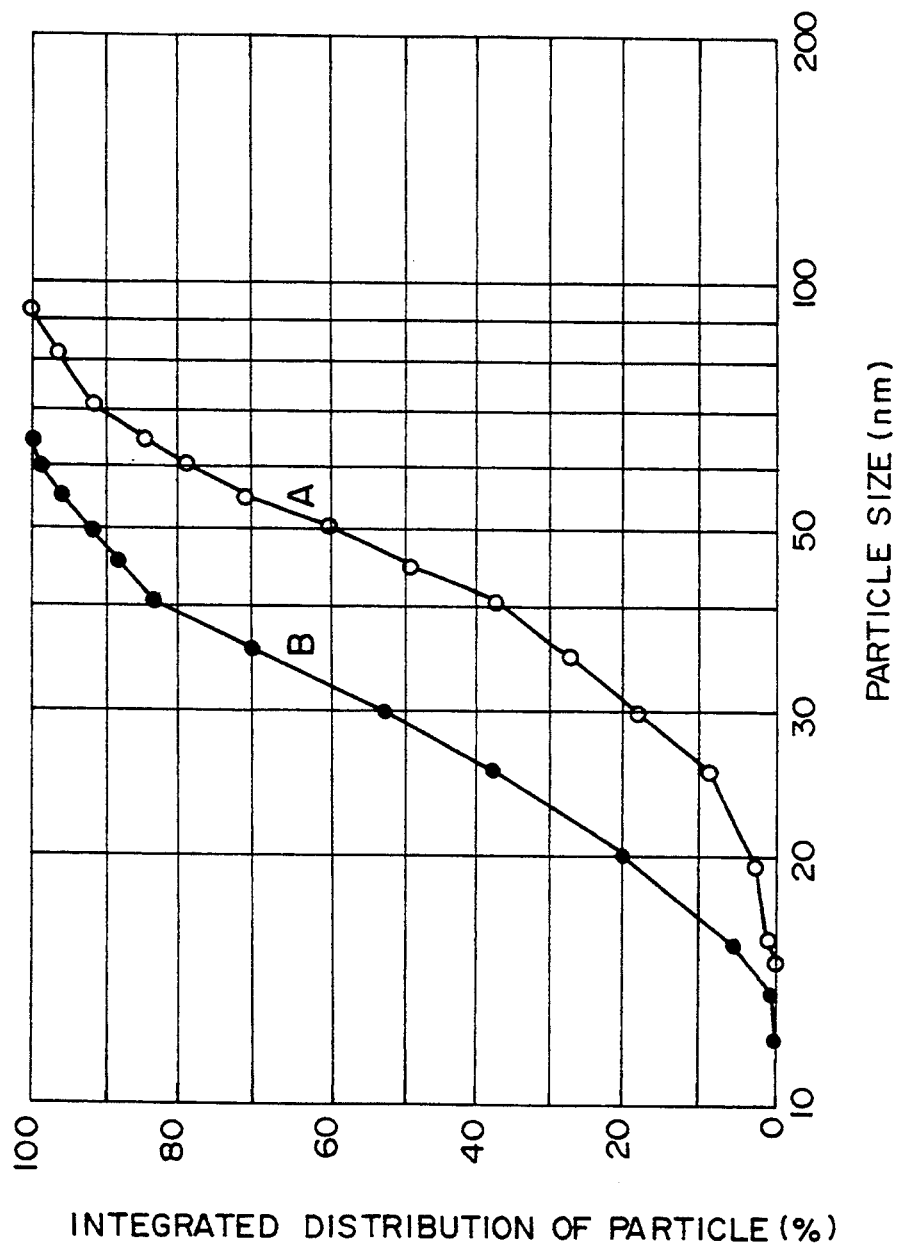
FIG. 3 is a graph showing the particle size distribution of the primary particles of organic pigments in the pigment dispersions obtained in Preparation Examples 6 and 7.

Into the micellar electrolytic dispersion listed in Table 6, a transparent electrode substrate having a face resistance of 20Ω/□ (a 1.1 t thick, blue plate glass, produced by Geomatec Co., Ltd.) as an ITO film was dipped, and a platinum electrode was used as the counter electrode, subjected to a film-forming treatment for a period of time listed in Table 6 at a potential of 0.5V vs. SCE, to form a film of coloring matter. The dispersions used as above were found to have the particle size distribution whose typical examples are shown in FIG. 3A (Preparation Example 6) and FIG. 3B (Preparation Example 7).

The color film substrate formed as above was washed well with pure water and dried. Light resistance of the color film substrates thus produced was determined by using a xenon lamp of 13.5 kW and placing a substrate at a distance of 300 mm from the light source. Under the condition of substrate temperature at 70° C., said substrate was subjected to exposure for 100 hours at a visible illuminance of 330,000 lux and at a ultraviolet illuminance of 130 W/m² (300 to 400 nm), to determine the color difference before and after the exposure. The results are shown in Table 6.

Where there was high transparency of color films because of the primary particles of pigment having an average particle size of 20 to 200 nm, said color films could have markedly improved light resistance by controlling the particle size distribution to be within ±35 nm to obtain uniform particles.

TABLE 6

| Preparation Example (Mixing ratio by weight) | Film-forming time (min.) | Color difference $\Delta E_{ab}$ (before/after) |
|---|---|---|
| Comparative Example 3 | 9 | 2 | 24.6 |
| Comparative Example 4 | 8 | 3 | 37.3 |
| Example 9 | 7 | 20 | 4.3 |
| Comparative Example 5 | 6 | 15 | 8.6 |
| Example 10 | 4/7 (70:30) | 20 | 1.7 |
| Comparative Example 6 | 4/7 (82.5:17.5) | 25 | 5.6 |

EXAMPLES 11, 12 AND COMPARATIVE EXAMPLES 7~10

Into the micellar electrolytic dispersion listed in Table 7, a transparent electrode substrate having a face resistance of 20Ω/□ (a 1.1 t thick, blue plate glass, produced by Geomatec Co., Ltd.) as an ITO film was dipped, and a platinum electrode was used as the counter electrode, subjected to a film-forming treatment for a period of time listed in Table 7 at a potential of 0.5V vs. SCE, to form a film of coloring matter. This color film substrate was washed well with pure water and dried.

Said substrate was revolved at 10 rpm, 30 cc of SS-7265 (produced by Japan Synthetic Rubber Co., Ltd.) as a topcoating agent was sprayed on it and the revolution of the spin coater was raised to 1000 rpm, to form a uniform coat on the thin film substrate. The resultant substrate was postbaked at 220° C. for 50 minutes.

Light resistance of the color film substrates thus produced was determined by using a xenon lamp of 2.5 kW and placing a substrate at a distance of 90 mm from the light source. Under the condition of substrate temperature at 120° C., said substrate was subjected to exposure for 200 hours at a visible illuminance of 520,000 lux and at a ultraviolet illuminance of 170 W/m² (300~400 nm), to determine the color difference before and after the exposure. The results are shown in Table 7.

Where there was high transparency of the color films because of the primary particles of pigment having an average particle size of 20 to 200 nm, said color films could have markedly improved light resistance by controlling the particle size distribution to be within ±35nm to obtain the uniform particles.

Figure 4:
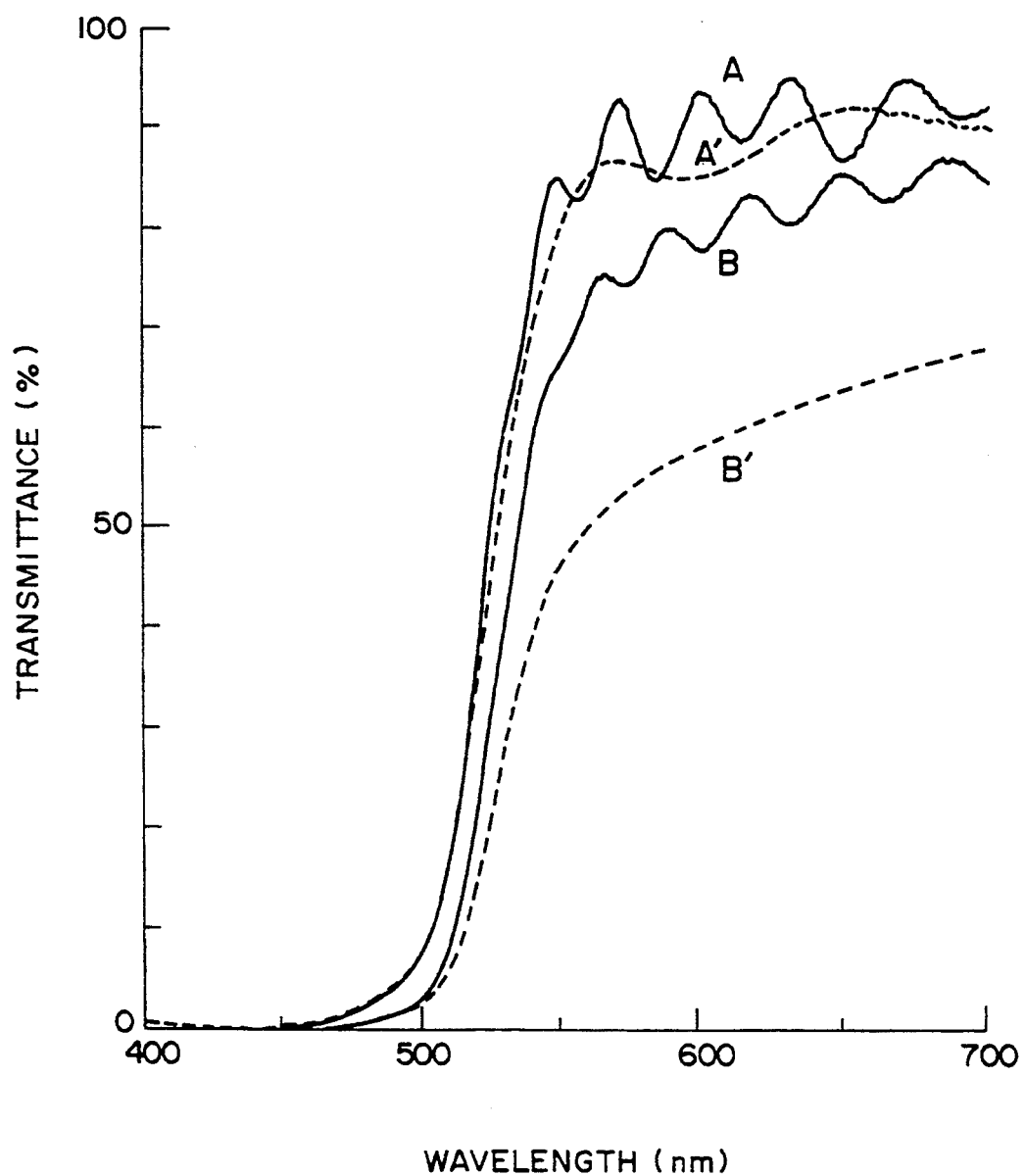
FIG. 4 is a graph showing the spectral transmittance before and after the light was irradiated to the film of coloring matter obtained in Example 11 and Comparative Example 9.

FIG. 4 shows the spectral transmittance of color films before (solid line) and after (dotted line) the irradiation of light with respect to Example 11(A) and Comparative Example 9(B).

EXAMPLE 13 AND COMPARATIVE EXAMPLE 11

A transparent glass substrate (a 1.1 t thick, blue plate glass, produced by Diomatech Co.) was revolved at 10 rpm, 30 cc of a pigment-dispersed resist listed in Table 7 was sprayed on it and the revolution of spin coater was raised to 1000 rpm, to form a uniform coat on the thin film substrate. The resultant substrate was postbaked at 220° C. for 50 minutes.

Light resistance of the color film substrates thus produced was determined by using a xenon lamp of 2.5 kW and placing a substrate at a distance of 90 mm from the light source. Under the condition of substrate temperature at 120° C., said substrate was subjected to exposure for 200 hours at a visible illuminance of 520,000 lux (380 to 780 nm) and at a ultraviolet illuminance of 70 W/m$^2$ (300 to 400 nm), to determine the color difference before and after the exposure. The results are shown in Table 7.

Where there was high transparency of the color films because of the primary particles of pigment having an average particle size of 20 to 200(μm, said color films could have markedly improved light resistance by controlling the particle size distribution to be within ±35 nm to obtain the uniform particles.

TABLE 7

| | Preparation Example (Mixing ratio by weight) | Film-forming time (min.) | Color difference ΔE$_{ab}$ (before/after) |
|---|---|---|---|
| Comparative Example 7 | 9 | 2 | 55.5 |
| Comparative Example 8 | 8 | 3 | 26.3 |
| Example 11 | 7 | 20 | 2.3 |
| Comparative Example 9 | 6 | 15 | 14.8 |
| Example 12 | 4/7 (70:30) | 20 | 3.7 |
| Comparative Example 10 | 5/6 (82.5:17.5) | 25 | 13.5 |
| Example 13 | 17 | — | 3.1 |
| Comparative Example 11 | 18 | — | 6.4 |

EXAMPLES 14, 15 AND COMPARATIVE EXAMPLES 12~15

Into the micellar electrolytic dispersion of the Preparation Examples listed in Table 8, a transparent electrode substrate having a face resistance of 20Ω/□ (a 1.1 t thick, blue plate glass, produced by Geomatec Co., Ltd.) as an ITO film was dipped, and a platinum electrode was used as the counter electrode, subjected to a film-forming treatment for a period of time listed in Table 8 at a potential of 0.5 V vs. SCE, to form a film of coloring matter. This color film substrate was washed well with pure water and dried.

Said substrate was revolved at 10 rpm, 30 cc of SS-7265 (produced by Japan Synthetic Rubber Co., Ltd.) as a topcoating agent was sprayed on it and the revolution of the spin coater was raised to 1000 rpm, to form a uniform coat on the thin film substrate. The resultant substrate was postbaked at 220° C. for 50 minutes.

Light resistance of the substrates thus produced was determined by using a metal halide lamp of 160 W and placing a substrate at a distance from the light source to obtain the following illuminance. Under the condition of substrate temperature at 70° C., said substrate was subjected to exposure for 500 hours at a visible illuminance of 1,000,000 lux, to determine the color difference before and after the exposure. The results are shown in Table 8.

Where there was high transparency of the color films because of the primary particles of pigment having an average particle size of 20 to 200 nm, said color films could have markedly improved light resistance by controlling the particle size distribution to be within ±35 nm to obtain the uniform particles.

TABLE 8

| | Preparation Example (Mixing ratio by weight) | Film-forming time (min.) | Color difference ΔE$_{ab}$ (before/after) |
|---|---|---|---|
| Comparative Example 12 | 9 | 2 | 54.5 |
| Comparative Example 13 | 8 | 3 | 56.2 |
| Example 14 | 7 | 20 | 1.5 |
| Comparative Example 14 | 6 | 15 | 8.9 |
| Example 15 | 4/7 (70:30) | 20 | 2.4 |
| Comparative Example 15 | 5/6 (82.5:17.5) | 25 | 7.1 |

EXAMPLE 16 AND COMPARATIVE EXAMPLES 16~4 18

A transparent glass substrate (a 1.1t thick, blue plate glass, produced by Geomatec Co., Ltd.) was revolved at 10 rpm, 30 cc of a pigment-dispersed resist listed in Table 9 was sprayed on it and the revolution of the spin coater was raised to 1000 rpm, to form a uniform coat on the thin film substrate. The resultant substrate was postbaked at 220° C. for 50 minutes.

Light resistance of the color film substrates thus produced was determined by using a metal halide lamp of 160 W and placing a substrate at a distance from the light source to obtain following illuminance. Under the condition of substrate temperature at 70° C., said substrate was subjected to exposure for 500 hours at a visible illuminance of 1,000,000 lux, to determine the color difference before and after the exposure. The results are shown in Table 9.

Where there was high transparency of the color films because of the primary particles of pigment having an average particle size of 20 to 200 nm, said color films could have markedly improved light resistance by controlling the particle size distribution to be within ±35 nm to obtain uniform particles.

TABLE 9

| | Preparation Examples | Color difference ΔE$_{ab}$ (before/after) |
|---|---|---|
| Example 16 | 15 | 1.8 |
| Comparative Example 16 | 16 | 6.1 |
| Comparative Example 17 | 17 | 7.6 |
| Comparative Example 18 | 18 | 21.3 |

EXAMPLE 17

Preparation of Color Liquid Crystal Display

On the surface of a color film substrate having a protect co prepared in Example 2, ITO was subjected to masking vapor depos ion to form an ITO film. At this step, the substrate temperature was maintained at 250° C. to obtain an ITO film of 1100Å having a face resistance of 20Ω/□, and thus, color filters were obtained. On the surface of this color filter substrate, a polyamic acid resin monomer was spin coated by repeating the same procedure as in the resists. Then, said resin monomer was cured at 250° C. for 1 hour into polyimide resin, and was subjected to rubbing. After rubbing, between this resin-coated color filter and the above-mentioned color filter, glass beads and TN liquid crystal were put in in this order, sealed with an adhesive, to complete the panel. After a taken-out electrode mounting a driver IC was connected to FPC, and polarizers were adhesively bonded to both the surfaces, TFT was made to work, to confirm good liquid crystal drive.

The panel formed as above was set to a light source comprising an optical lens having the capacity of 1,000,000 lux, to project by the use of a 100 inch screen. Images were projected for 1000 hours, and then each picture element was determined for its color purity, with the results that R was 92% initially and 92% after projection; G was 70% initially and 69% after projection; and B was 79% initially and 79% after projection. Thus, color deterioration was hardly observed.

Industrial Applicability

The present invention provides the color filters having color films in the three primary colors of RGB, capable of withstanding the use of highly bright light sources and further excellent in light resistance and heat resistance. Particularly, being manufactured according to the micellar disruption method, these color filters are excellent in spectral properties and depolarizing properties, and further superior in light resistance and heat resistance as they are free of binder resins.

With their excellent light resistance, when used in liquid crystal projectors, the color filters of the present invention will enable said liquid crystal projectors to withstand the use of strong light sources. Liquid crystal projectors of single plate type which are resistant to the heat generated when intensely bright light sources are applied to color filters will also come true with the color filters of the present invention. When the color filters of the present invention are incorporated into them, overhead projectors and internal liquid crystal panels for car will be capable of using strong light sources to have marked improvement in reliability and in the life span.

The color filters of the present invention can find good applications in, for example, color FLC liquid crystal panels, color personal computers of lap top type, color word processors, color work stations, color aurora visions, liquid crystal color projectors, liquid crystal color television sets, liquid crystal color OHPs, color internal panels for car, color device monitoring apparatuses and so forth. Eventually the color filters of the present invention are applicable to and highly useful in a very wide segments of industry.

We claim:

1. A color filter having a film of coloring matter in the three primary colors of red, green and blue which comprises organic pigments to form the film of coloring matter in each of red, green and blue which pigments are comprised of primary particles having an average particle size of 20 to 200 nm and a particle size distribution within $+35$ nm, and have a color difference of 5 or less when said organic pigments as contained in said color filter are subjected to exposure for 100 hours or more at an illuminance of 100,000 lux or more by the use of a highly bright light source for projection under the condition of a surface temperature at 50° C. or higher.

2. A color filter having films of coloring matter comprising organic pigments in each of the three primary colors of red, green and blue, wherein the color film in green has a ratio ($T_{485}/T_{610}$) of the transmittance of 485 nm ($T_{485}$) to that of 610 nm ($T_{610}$) of 3.5 or lass, the maximum transmittance ($T_{MAX}$) of the film of coloring matter in green is 60% or more and said maximum transmittance is assigned the wavelengths in a range of 540 to 500 nm ($\lambda_{MAX}$).

3. The color filter as defined in claim 1 or 2, wherein C.I. Pigment Yellow 110 is used as a yellow pigment to adjust the color tone of either or both of red and green of the organic pigments.

4. The color filter as defined in claim 2, wherein a mixture of C.I. Pigment Yellow 110 and C.I. Pigment Green 36 is used as a pigment to adjust the color tone of at least green of the organic pigments.

5. The color filter as defined in claim 1 or claim 2 having a film of coloring matter in the three primary colors of red, green and blue which comprises a red (R) coloring matter comprising a single P.I. Pigment Red 168 or a single C.I. Pigment Red 177 or a mixed system pigment combining C.I. Pigment Red 168 with C.I. Pigment Yellow 110 or a mixed system pigment combining C.I. Pigment Red 177 with C.I. Pigment Yellow 110; a green (G) coloring matter comprising a mixed system pigment combining at least one compound selected from the group consisting of C.I. Pigment Green 7 and C.I. Pigment Green 36 with C.I. Pigment Yellow 110; and a blue (B) coloring matter comprising a mixed system pigment combining at least one compound selected from the group consisting of C.I. Pigment Blue 15:3, 15:4 and 15:6 with C.I. Pigment Violet 23.

* * * * *